United States Patent [19]

Mirtain

[11] 4,184,530
[45] Jan. 22, 1980

[54] TIRE AND REINFORCING BELT THEREFOR

[75] Inventor: Henri J. Mirtain, Compiegne, France

[73] Assignee: Uniroyal, S.A., Campiegne, France

[21] Appl. No.: 962,841

[22] Filed: Nov. 21, 1978

[30] Foreign Application Priority Data

Nov. 25, 1977 [FR] France ................... 77 35542

[51] Int. Cl.$^2$ ............................................. B60C 9/10
[52] U.S. Cl. ............................................. 152/361 FP
[58] Field of Search .... 152/361 R, 361 FQ, 361 DM, 152/354 R

[56] References Cited

U.S. PATENT DOCUMENTS

| | | | |
|---|---|---|---|
| 3,126,042 | 3/1964 | Cegnar | 152/361 DM |
| 3,850,219 | 11/1974 | Snyder | 152/361 DM |
| 3,881,538 | 5/1975 | Mirtain | 152/361 FP |
| 3,945,421 | 3/1976 | Poqué | 152/361 FP |

Primary Examiner—Robert B. Reeves
Assistant Examiner—Gene A. Church
Attorney, Agent, or Firm—Philip Rodman

[57] ABSTRACT

A pneumatic tire having a reinforcing belt which includes a first ply of cords formed from a synthetic material having a high modulus of elasticity and a second ply of metallic cords. The first ply has a width substantially equal to the width of the tread of the tire. The second ply has a width between one-fourth and three-fourths of the width of the tread. The second ply reinforces the median region of the tread. Each cord of the first ply intersects the median equatorial plane of the tire at a first angle of from 14° to 30°; each cord of the second ply intersects the median equatorial plane of the tire at a second angle of from 22° to 32°. The second angle is opposite in direction from the first angle. At least one strip of cords formed from a synthetic material having a low modulus of elongation overlaps an edge region of the second ply. The foregoing abstract is not to be taken as a complete exposition of the present invention.

20 Claims, 8 Drawing Figures

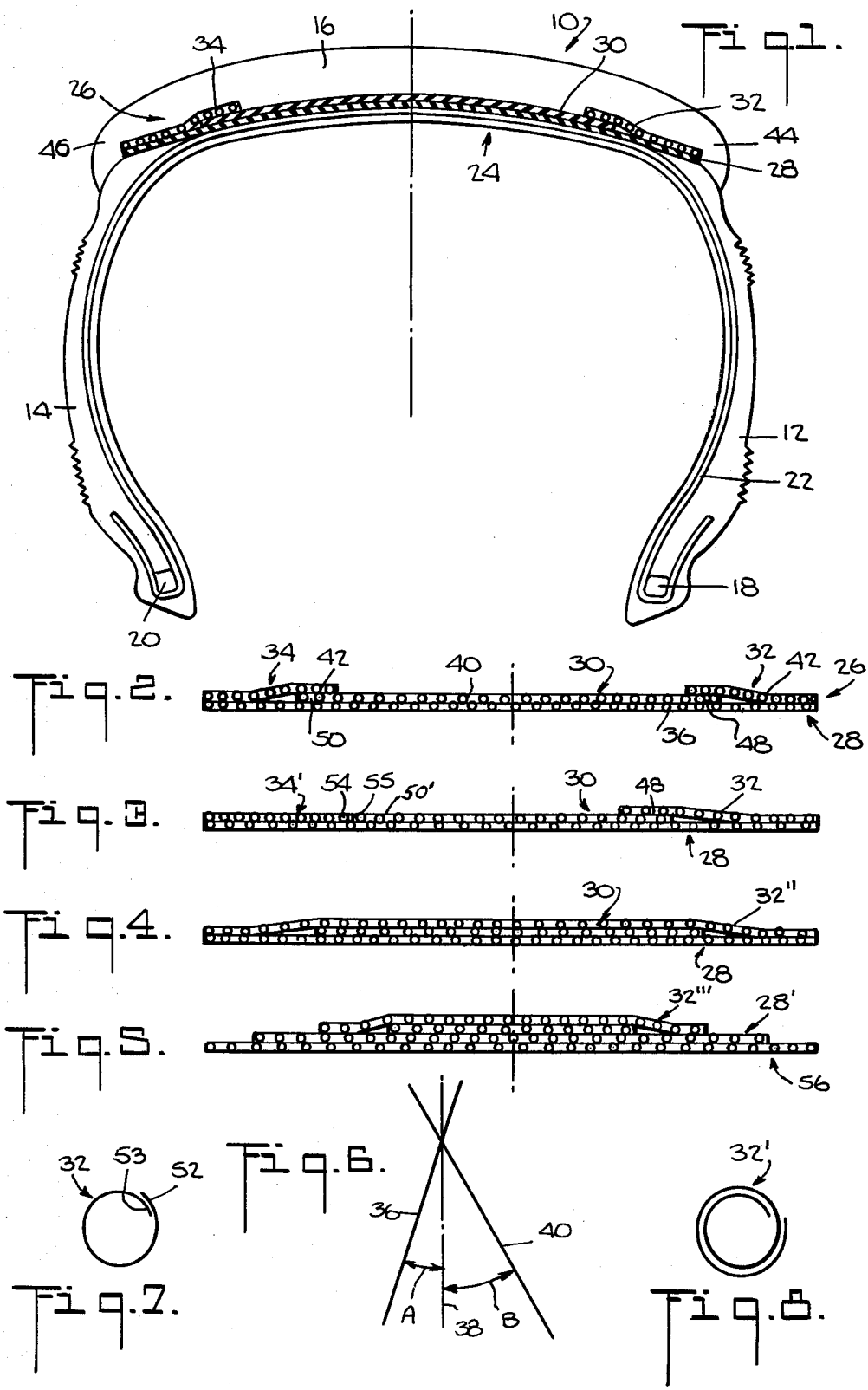

though the tire of the present invention is a pneumatic tire, the invention is not limited to pneumatic tires.

TIRE AND REINFORCING BELT THEREFOR

BACKGROUND OF THE INVENTION

This invention relates to pneumatic tires, and more particularly relates to pneumatic tires having a reinforcing belt in the area of the carcass which underlies the tread of the tire.

As used in this disclosure with reference to a tire, the terms "circumferential" should be understood as referring to the directions around the circumference of the tire. The terms "axial" and "axially" should be understood as referring to the directions parallel to the axis of revolution of the tire and perpendicular to the median equatorial plane of the tire. The terms "radial" and "radially" should be understood as referring to the directions toward or away from the axis of revolution of the tire.

The terms described above may also be used with reference to an endless, hooplike belt structure adapted to underlie the tread of a tire, and when they are so used they should be understood with reference to the circumference, the median equatorial plane and the axis of revolution of the belt itself. In a tire which incorporates a belt, the circumferential, axial and radial directions of the belt will normally be identical with the corresponding directions of the tire.

The tread region of a tire carcass should have substantial rigidity or resistance to deformation in the circumferential and axial directions. As the rigidity of the tread region of the carcass in the circumferential and axial directions is increased, the tread wear and handling characteristics of the tire improve. To provide such increased rigidity, it has long been known in the art to provide an endless, hooplike reinforcing belt in the crown region of the carcass which underlies the tread. Such reinforcing belts are expecially useful in the so-called "radial ply" type of tire. In the radial ply type of tire, the cords of the carcass or body plies of the tire extend substantially radially in the sidewalls of the tire and extend substantially axially in the crown region of the tire. Because the body ply cords of "radial ply" tires do not reinforce the crown or tread regions of such tires in the circumferential direction to any substantial degree, "radial ply" tires almost universally incorporate reinforcing belts.

The reinforcing belts of the prior art consist of one or more plies of rubber coated cords. These plies are constructed as endless hoops which extend circumferentially in the crown region of the carcass radially outwardly of the carcass plies but radially inwardly of the tread.

If a single belt ply is used, the cords of that ply are oriented so that they extend substantially circumferentially or substantially parallel with the median equatorial plane of the tire.

If a plurality of plies are used, the prior art teaches that they are to be provided in pairs of plies, the cords of each ply of a pair being formed from the same material as the cords of the other ply of the same pair. The cords of each ply of such a pair intersect the median equatorial plane of the tire at an angle, but the pairs of plies are arranged so that the cords of one ply of the pair intersect the median equatorial plane at an angle which is equal in magnitude but opposite in direction from the angle at which the cords of the other ply of the same pair intersect the median equatorial plane. Thus, the cords of each ply of such a pair may be said to be "crossed" with respect to the cords of the other ply of the same pair. The two plies constituting each such pair are positioned immediately adjacent to one another.

For example, U.S. Pat. No. 3,850,219 teaches the use of one pair of steel cord plies. The cords of one of these plies intersect the median equatorial plane of the tire at an angle of from 16° to 30° in one direction. The cords of the other one of these plies intersect the median equatorial plane of the tire at an angle of the same magnitude but in the opposite direction. U.S. Pat. No. 3,126,042 teaches the use of two pairs of plies: a pair of steel cord plies and a pair of textile cord plies. The pair of textile cord plies is positioned radially outwardly of the pair of steel cord plies. U.S. Pat. No. 2,982,328 also teaches the use of pairs of plies.

Other reinforcing belt structures are taught by U.S. Pat. Nos. 3,793,612 and 3,786,851, and by French Pat. No. 1,586,370.

All of the aforementioned reinforcing belt structures reinforce the crown or tread region of the tire in both the lateral and circumferential directions to some extent. However, none of these structures combines, to the optimum extent, the desirable rigidity of the crown region with the soft riding characteristics, light weight and low cost of manufacture which are also desirable.

Further, reinforcing belt structures are subject to the phenomenon known as "belt edge separation". Belt edge separation occurs when the edges of the belt plies become displaced radially outwardly from their normal position during high speed operation of the tire and thus become separated from the underlying carcass plies. Various expedients have been suggested to eliminate belt edge separation. For example, the aforesaid U.S. Pat. No. 3,850,219 and the aforesaid French Pat. No. 1,586,370 teach the use of so-called "cap plies" as a part of the belt structure. The "cap plies" are positioned radially outwardly of the other belt plies, and consist or rubber coated nylon cords which extend substantially parallel to the median equatorial plane of the tire. These "cap plies" help to prevent belt edge separation by physically restraining the other plies of the reinforcing belt against radially outward movement. However, a further increase in resistance to belt edge separation beyond the degree of resistance provided by the cap plies alone is still desirable.

SUMMARY OF THE INVENTION

Accordingly, it is a principal object of the present invention to provide a tire with a reinforcing belt structure which provides an improved combination of circumferential and axial rigidity, riding comfort, low cost of manufacture, light weight and resistance to belt edge separation.

It is a further object of the present invention to provide a reinforcing belt which, when incorporated into a tire, will help to provide these desirable properties.

The tire of the present invention includes a pair of sidewalls, and a tread extending axially between the sidewalls. The reinforcing belt of the present invention underlies the tread in the crown region of the carcass. The reinforcing belt includes a first ply of cords formed from a non-metallic synthetic material having a high modulus of elasticity, and a second ply of metallic cords. The second ply of metallic cords lies radially outwardly of the first ply and overlies the medial region of the first ply. The second ply has a width which is less than the width of the first ply and which is between about one-fourth and about three-fourths of the width of the tread of the tire. At least one strip of cords formed from a non-metallic synthetic material having a low modulus of elasticity lies radially outwardly of the first ply. A portion of the strip overlies at least one of the edge regions of the second ply. As in the normal practice, the cords of each of the plies, and the cords of the strip are coated with rubber.

Preferably, the cords of the first ply are formed from an aromatic and intersect the median equatorial plane of the tire at a so-called "first angle" of from 14° to 30°, while the cords of the second ply are formed from steel and intersect the median equatorial plane of the tire at a so-called "second angle" of from 22° to 32°. The second angle is opposite in direction from the first angle. Preferably, the cords of the strip are formed from nylon or polyester and extend substantially parallel to the median equatorial plane of the tire.

By contrast with the tires and reinforcing belt structures of the prior art, the second or metallic-cord ply of the belt structure of the present invention is not paired with another metallic-cord ply. That is, no other metallic-cord ply lies immediately adjacent to it. It is believed that the use of a metallic-cord ply in such an unpaired state prevents the shearing motions which are believed to occur between the paired metallic-cord plies found in the belt structures of the prior art. Therefore, it is believed that the unpaired state of the second or metallic-cord ply in the belt of the present invention contributes to the improved resistance to belt edge separation which is possessed by the tire of the present invention.

The second or metallic-cord ply in the belt structure of the tire of the present invention does not extend into the so-called "shoulder regions" of the tire (the regions where the crown region of the tire joins the sidewalls). Therefore, the edges of the second ply are not subjected to the high temperature and severe flexing which occur in the shoulder regions during high-speed operation. It is believed that the protection of the edges of the metallic-cord ply from the temperature and flexure extremes of the shoulder regions also contributes to the resistance to belt edge separation of the tire of the present invention. This protection is achieved without sacrificing the reinforcing effect of the second or metallic cord ply to any substantial degree, because the second or metallic-cord ply underlies the medial region of the tread, where the need for reinforcement is the greatest. The first ply does extend into the shoulder region. However, because of the low mass and relatively good adhesion characteristics of the non-metallic synthetic cords which constitute the first ply, the first ply has substantial resistance to belt edge separation even under the adverse conditions encountered in the shoulder regions. The strip or strips also contribute to the resistance to belt edge separation of the tire of the present invention.

These and other objects, features and advantages of the present invention can be better understood from the following detailed description of the preferred embodiments, when read in conjunction with the accompanying drawings.

BRIEF DESCRIPTION OF THE DRAWINGS

FIG. 1 is a partial sectional view of a tire according to a preferred embodiment of the present invention.

FIG. 2 is a sectional view of the reinforcing belt structure of the tire depicted in FIG. 1.

FIGS. 3 through 5 are views similar to FIG. 2 but depicting belt structures according to alternate embodiments of the present invention.

FIG. 6 is a diagrammatic view depicting the cord angles of the first and second plies in the reinforcing belt structure shown in FIG. 2.

FIG. 7 is a schematic view depicting one of the strips of the belt depicted in FIG. 2.

FIG. 8 is a schematic view similar to FIG. 7 but depicting a strip of a belt according to an alternate embodiment of the present invention.

DETAILED DESCRIPTION OF THE PREFERRED EMBODIMENTS

As shown in FIG. 1, a tire 10 according to a preferred embodiment of the present invention includes a pair of sidewalls 12 and 14 and a tread 16 which extends axially between the sidewalls. In the conventional manner, the tire is provided with a pair of beads 18 and 20 at the radially inwardmost regions of the sidewalls. A carcass ply 22 extends from bead to bead. Preferably, the cords of this carcass ply 22 extend substantially radially along each sidewall and extend across the crown region 24 of the tire (the region underlying the tread 16) substantially perpendicularly to the median equatorial plane of the tire. A reinforcing belt 26 is provided in the crown region of the tire. The reinforcing belt is positioned radially outwardly of the carcass ply 22.

As shown most clearly in FIG. 2, the reinforcing belt 26 includes a first ply 28, a second ply 30 and a pair of cap plies or strips 32 and 34. Each cord of each of the plies extends substantially parallel to the other cords of the same ply. Each one of these plies consists of rubber coated cords. As used in this disclosure, the term "cord" should be understood to mean an elongated filimentary structure. Such a structure may be constituted by a single relatively thick filament or by a plurality of extremely fine strands twisted together to form a unitary filimentary structure. The rubber coating may consist of natural or synthetic rubber, and may be applied to the cords by conventional methods such as skim coating.

The cords 36 of the first ply 28 are formed from a nonmetallic synthetic textile material having a high modulus of elasticity. As used in this disclosure, the term "high modulus of elasticity" should be understood to mean a modulus of elasticity in excess of 3,500 kilograms per square milimeter. Preferably, the cords 36 of the first ply are formed from an aromatic polyamide.

As shown in FIG. 6, the cords 36 of the first ply 28 intersect the median equatorial plane 38 of the tire at a first angle A. This first angle A is preferably between 14° and 30° in magnitude, and most preferably has a magnitude of 16°.

The cords 40 of the second ply 30 (FIG. 2) are formed from a metallic material, preferably steel. As shown in FIG. 6, these cords intersect the median equatorial plane 38 of the tire at a second angle B which is opposite in direction from the first angle A. The second angle B has a magnitude of from 22° to 32°, and most preferably 30°. The second ply 40 is not paired with any other ply of metallic cords; no ply of metallic cords lies immediately adjacent to the second ply 40.

The cords 42 of the strips 32 and 34 (FIG. 2) are formed from a non-metallic synthetic material having a low modulus of elasticity. That is, the material of the cords 42 has a modulus of elasticity substantially less than 3,500 kilograms per square millimeter. Preferably, the cords extend substantially parallel to the median equatorial plane of the tire (at angles of less than 5° from the circumferential direction).

As shown in FIGS. 1 and 2, the second ply 30 lies radially outwardly of the first ply 28 and overlies the medial region of the first ply. Thus, the second ply 30 underlies the medial region of the tread 16. However, because the second ply 30 is narrower than the tread, the second ply 30 does not extend to the shoulder regions 44 and 46 of the tire. By contrast, the first ply 28 has a width substantially equal to the width of the tread (i.e., substantially equal to the axial dimension of the ground contacting surface of the tread), so that the first ply extends into the shoulder regions 44 and 46.

In the embodiment depicted in FIGS. 1 and 2, two cap plies or strips 32 and 34 are provided. These cap plies lie radially outwardly of the first ply 28. The portions of these cap plies closest to the median equatorial plane of the tire lie radially outwardly of the edge regions 48 and 50 of the second ply 40, and overlap these edge regions. Preferably, each one of the strips 32 and 34 overlaps the second ply 40 over a zone between 10 and 15 millimeters in axial extent. That is, the edge regions 48 and 50 which are overlapped by the strips are between 10 and 15 millimeters wide. Therefore, the strips 32 and 34 can restrain the edge regions of the second ply against radially outward movement. The strips 32 and 34 extend laterally to the edges of the first ply 28. Therefore, the strips 32 and 34 help to prevent belt edge separation at the edges of the first ply 28 by restraining these eges against radially outward movement.

Although the features of a tire according to the preferred embodiment of the present invention have been described above with reference to single sectional view through the tire, it should be clearly understood that these features extend around the entire circumference of the tire. That is, the plies 28 and 30 and the strips 32 and 34 form endless hoops. An endless hoop may incorporate a splice at one point. Preferably, the strips 32 and 34 should be provided with overlap splices. An overlap splice is shown schematically in FIG. 7. The strip 32 extends more than one full turn around the circumference of the tire so that an end portion 52 of the strip 32 overlaps another portion 53 of the strip 32. This overlapping of the ends of the strip 32 provides a strong joint at the splice.

Depending on the degree of strength required in the strips, and on the number and diameter of cords in each strip, it may be desirable to further increase the strength of the strip by wrapping the strip approximately two full turns around the tire as shown in FIG. 8. The strip 32' depicted in FIG. 8 extends approximately two full turns around the tire so that it overlaps itself completely. Thus, the strip 32' has approximately twice the strength it would have if it only overlapped itself at a splice.

As shown in FIG. 3, an alternate embodiment of the present invention includes a first ply 28, a second ply 30 and a first strip 32 similar to those described above. However, the second strip 34' of this embodiment does not overlap the second ply 30. Instead, the second strip 34' lies in substantially edge to edge abutting relation with the second ply 30. An edge 54 of the second strip 34' abuts an edge 55 of the second ply which is axially opposite from the edge region 48 of the second ply overlapped by the first strip 32. In other respects, the strip 34' of this embodiment is similar to the second strip 34 described above and depicted in FIGS. 1 and 2.

Because the edge region 50' of the second ply 30 adjacent to edge 55 is not overlapped by the second strip 34' in the embodiment depicted in FIG. 3, this embodiment may have somewhat less resistance to belt edge separation than the embodiment described above with reference to FIGS. 1 and 2. However, because of the other features of the present invention (the unpaired arrangement of the second ply 30 and the protection of the edges of the second ply 30 from the fexure and temperature extremes of the shoulder regions), this embodiment will have substantial resistance to separation of the second ply, even at the edge 55. Further, the second strip 34' of this embodiment is believed to help prevent belt edge separation at the edge 55 of the second ply 30 by restraining the adjacent areas of the tire and thus preventing extreme strains at the edges of the second ply 30. Even so, a tire incorporating an assymetrical belt like that shown in FIG. 3 will have greater resistance to belt edge separation on the side of the tire which incorporates first strip 32 than on the side which incorporates second strip 34'. Such a tire should be mounted on a vehicle so that the side incorporating first strip 32 bears the move severe conditions in service.

A further alternate embodiment of the present invention includes a first ply 28 and a second ply 30 like those described above with reference to FIGS. 1 and 2. However, the second strip is omitted in this embodiment. The first strip 32" has an axial extent or width equal to the width of the first ply 28 (substantially equal to the width of the tread). Therefore, the first strip 32 overlaps the second ply 30 over the entire axial extent of the second ply. Further, the strip 32" extends to both edges of the first ply 28. Therefore, this single strip 32" substantially reinforces the edges of both the first ply 28 and the second ply 30 against radially outward movement.

A further alternate embodiment of the present invention is depicted in FIG. 5. This embodiment is similar to the embodiment depicted in FIG. 4. However, the first strip 32" of the embodiment depicted in FIG. 5 does not extend to the lateral edges of the first ply 28'. Also, a third ply 56 is positioned radially inwardly of the first ply 28'. Preferably, the cords of the third ply intersect the median equatorial plane of the tire at an angle equal in magnitude but opposite in direction from the angle at which the cords of the first ply 28' intersect the median equatorial plane. That is, the cords of the third ply 56 are crossed with respect to the cords of the first ply 28'. Preferably, the cords of the third ply 56 are formed from the same material as the cords of the first ply 28'. As shown in FIG. 5, the third ply 56 is only slightly wider than the first ply 28', so that both of these plies terminate in the shoulder regions of the tread. Alternatively, the third ply 56 may be formed with an even greater width so that it extends downwardly into the sidewall regions of the tire. As a further alternative, the first ply 28' and the third ply 56 may be formed with equal widths.

As numerous variations and combinations of the features set forth in the above description of the preferred embodiments may be made without departing from the spirit of the present invention as set forth in the appended claims, the foregoing description of the preferred embodiments should be taken as merely illustrative.

What is claimed is:

1. A pneumatic tire comprising a pair of sidewalls, a tread extending axially between the sidewalls, and a reinforcing belt underlying the tread, said reinforcing belt comprising a first ply of cords formed from a non-metallic synthetic material having a high modulus of elasticity, a second ply of metallic cords radially outward of said first ply and overlying the medial region of said first ply, said second ply having a width which is less than the width of said first ply and which is between about one fourth and about three fourths of the width of said tread, and a strip of cords formed from a non-metallic synthetic material having a low modulus of elasticity, said strip lying radially outwardly of said first ply, at least a portion of said strip lying radially outwardly of said second ply and overlapping a first edge region of said second ply, the cords of said first ply, said second ply and said strip being coated with rubber.

2. A tire as claimed in claim 1, wherein said first ply has a width substantially equal to the width of the tread.

3. A tire as claimed in claim 1, wherein said cords of said strip extend substantially parallel to the median equatorial plane of the tire.

4. A tire as claimed in claim 1, wherein said cords of said first ply are substantially parallel with one another and intersect the median equatorial plane of the tire at a first angle of from 14° to 30°.

5. A tire as claimed in claim 4, wherein said cords of said second ply are substantially parallel with one another and intersect the median equatorial plane of the tire at a second angle of from 22° to 32°, said second angle being opposit in direction from said first angle.

6. A tire as claimed in claim 4, wherein said strip extends more than one full turn around the tire so that at least an end portion of said strip overlaps another portion of said strip.

7. A tire as claimed in claim 6, wherein said strip extends approximately two full turns around the tire.

8. A tire as claimed in claim 3, wherein the width of said strip is substantially equal to the width of the tread and said strip overlaps both edges of said second ply.

9. A tire as claimed in claim 3, wherein the width of said strip is less than the width of the tread and said strip overlaps only said first edge region of said second ply, further comprising a second strip of cords formed from a non-metallic synthetic material having a low modulus of elasticity, the cords of said second strip being coated with rubber, the cords of said second strip extending substantially parallel to the median equatorial plane of the tire, said second strip lying radially outwardly of said first ply, at least a portion of said strip lying radially outwardly of said second ply and overlying second edge region of said second ply opposite from said first edge region of said second ply.

10. A tire as claimed in claim 9, wherein each of said strips extends to an edge of said first ply.

11. A tire as claimed in claim 10, wherein the axial extent of each of said edge regions of said second ply overlapped by said strips is between 10 and 15 millimeters.

12. A tire as claimed in claim 3, further comprising a second strip of cords formed from a non-metallic synthetic material having a low modulus of elasticity, the cords of said second strip being coated with rubber and extending substantially parallel to the median equatorial plane of the tire, said second strip lying radially outwardly of said first ply, an edge of said second strip abutting an edge of said second ply opposite from said first edge region of said second ply.

13. A tire as claimed in claim 1, wherein said metallic cords of said second ply are formed from steel, said synthetic material having a high modulus of elasticity is an aromatic polyamide, and said synthetic material having a low modulus of elasticity is selected from the group consisting of nylon and polyester.

14. A tire as claimed in claim 1 wherein said second ply is unpaired.

15. An endless reinforcing belt adapted to underlie the tread of a pneumatic tire, said reinforcing belt comprising a first ply of cords formed from a synthetic material having a high modulus of elasticity, a second ply of metallic cords radially outward of said first ply and overlying the medial region of said first ply, said second ply having a width which is less than the width of said first ply and which is between about one fourth and about three fourths of the width of the tread which the belt is adapted to underlie, and a strip of cords formed from a synthetic material having a low modulus of elasticity, said strip lying radially outwardly of said first ply, at least a portion of said strip lying radially outwardly of said second ply and overlapping at least a first edge region of said second ply, the cords of said first ply, said second ply and said strip being coated with rubber.

16. A belt as claimed in claim 15, wherein said first ply has a width substantially equal to the width of the tread which the belt is adapted to underlie.

17. A belt as claimed in claim 15, wherein the cords of said strip extend substantially parallel to the median equatorial plane of the belt.

18. A belt as claimed in claim 15, wherein the cords of said first ply are substantially parallel with one another and intersect the median equatorial plane of the belt at a first angle of from 14° to 30°.

19. A belt as claimed in claim 18, wherein the cords of said second ply are substantially parallel with one another and intersect the median equatorial plane of the belt at a second angle of from 22° to 32°, said second angle being opposite in direction from said first angle.

20. A belt as claimed in claim 15 or claim 19 wherein said second ply is unpaired.

* * * * *

UNITED STATES PATENT AND TRADEMARK OFFICE
CERTIFICATE OF CORRECTION

PATENT NO. : 4,184,530
DATED : January 22, 1980
INVENTOR(S) : Henri Jean Mirtain It is certified that error appears in the above–identified patent and that said Letters Patent are hereby corrected as shown below:

Column 3, line 10, after "aromatic" insert --polyamide--.

Column 6, line 25, change "move" to --more--.

Column 7, line 32, change "opposit" to --opposite--.

Signed and Sealed this

Fifteenth Day of April 1980

[SEAL]

Attest:

SIDNEY A. DIAMOND

Attesting Officer

Commissioner of Patents and Trademarks